United States Patent [19]

Chung et al.

[11] Patent Number: 5,777,047
[45] Date of Patent: *Jul. 7, 1998

[54] ORGANOSILOXANE COMPOSITIONS WITH FLUORINATED RESINS CURABLE TO SILICONE ELASTOMERS HAVING LOW WEEP

[75] Inventors: Kyuha Chung; Stephen Clay Warren. both of Midland, Mich.

[73] Assignee: Dow Corning Corporation. Midland, Mich.

[*] Notice: The term of this patent shall not extend beyond the expiration date of Pat. No. 5,756,598.

[21] Appl. No.: 777,474

[22] Filed: Dec. 30, 1996

[51] Int. Cl.$^6$ .................................. C08F 283/00
[52] U.S. Cl. .................. 525/478; 528/32; 528/42; 528/15
[58] Field of Search .................. 525/478; 528/42, 528/32, 15

[56] References Cited

U.S. PATENT DOCUMENTS

| | | | |
|---|---|---|---|
| 2,676,182 | 4/1954 | Daudt et al. | 260/448.2 |
| 3,249,581 | 5/1966 | Nelson | 260/37 |
| 3,445,420 | 5/1969 | Kookootsedes et al. | 260/37 |
| 4,322,518 | 3/1982 | Blizzard | 528/15 |
| 4,465,818 | 8/1984 | Shirahata et al. | 528/12 |
| 4,472,563 | 9/1984 | Chandra et al. | 528/15 |
| 4,559,396 | 12/1985 | Sasaki et al. | 528/15 |
| 4,562,096 | 12/1985 | Lo et al. | 427/208.8 |
| 4,774,111 | 9/1988 | Lo | 427/387 |
| 4,830,925 | 5/1989 | Swihart et al. | 428/450 |
| 4,871,782 | 10/1989 | Modic et al. | 521/88 |
| 5,164,461 | 11/1992 | Mitchell et al. | 525/478 |
| 5,292,586 | 3/1994 | Lin et al. | 428/355 |
| 5,574,073 | 11/1996 | Juen et al. | 521/134 |

FOREIGN PATENT DOCUMENTS

| | | |
|---|---|---|
| 0 509515 A1 | 10/1992 | European Pat. Off. |
| 07 216307 | 8/1995 | Japan. |

*Primary Examiner*—Melvyn I. Marquis
*Attorney, Agent, or Firm*—Sharon K. Severance

[57] ABSTRACT

Organosiloxane compositions curable to silicone elastomers having improved weep properties are described. The compositions include an alkenyl-containing polydiorganosiloxane, an organohydrogensiloxane, a platinum-group metal catalyst and a MQ-type resinous organosiloxane copolymer having at least one fluorine atom-containing group per molecule; and a silicone elastomer prepared from such composition. A method of minimizing the leakage of a hydrocarbon fluid from a container using the silicone elastomer is also described.

30 Claims, No Drawings

5,777,047

1

ORGANOSILOXANE COMPOSITIONS WITH FLUORINATED RESINS CURABLE TO SILICONE ELASTOMERS HAVING LOW WEEP

BACKGROUND OF THE INVENTION

1. Field of the Invention

This invention relates to organosiloxane compositions which are curable to silicone elastomers. More particularly, the present invention relates to organosiloxane compositions which yield, upon cure, silicone elastomers which exhibit improved weep properties. This invention also relates to silicone elastomers prepared from such organosiloxane compositions. The invention also relates to a method of minimizing the leakage of a hydrocarbon fluid from a container by sealing the container with a silicone elastomer of the present invention.

2. Description of the Related Art

A description of the related art and the present invention requires that the definition of certain terms be understood. As used herein, the term "resin" describes a silicone composition wherein the molecular structure is arranged in a predominantly three dimensional network. The silicone resins utilized in the present invention are frequently designated "MQ" resins. MQ resins are macromolecular polymers comprised primarily of $R_3SiO_{1/2}$ and $SiO_{4/2}$ units (the M and Q units, respectively) wherein R is a functional or nonfunctional, substituted or unsubstituted organic radical. Those skilled in the art will appreciate that such resins may also include a limited number of $R_2SiO_{2/2}$ and $RSiO_{3/2}$ units, respectively referred to as D and T units. As used herein, the term "MQ resin" means that, on average, no more than about 20 mole percent of the resin molecules are comprised of D and T units. Such resins are frequently produced by the method disclosed in U.S. Pat. No. 2,676,182, which issued to Daudt et al., and which is incorporated herein by reference.

When a silicone elastomer is placed in contact with or immersed in a hydrocarbon fluid, such as, for example, automobile engine oil, the silicone elastomer will absorb some or all of the hydrocarbon fluid. As a result, the silicone elastomer will swell. The greater the volume of fluid absorbed by the silicone elastomer the greater the swell of the elastomer. The amount of fluid absorbed by the elastomers is dependent upon, inter alia, the specific elastomer, the specific hydrocarbon fluid, the length of time of exposure and the temperature.

When a silicone elastomer which has been immersed in a hydrocarbon fluid at ambient temperature is subsequently heated, the silicone elastomer will absorb more of the hydrocarbon fluid. When this silicone elastomer is then allowed to cool to ambient temperatures, some of the absorbed hydrocarbon fluid will bleed out of the silicone elastomer. The weep properties of an elastomer is a measure of the tendency of the hydrocarbon fluid to bleed from the elastomer. The weep number of an elastomer is the difference between that elastomer's weight uptake of a hydrocarbon fluid at elevated and room temperatures, based on 100 grams of elastomer.

Organosiloxane compositions curable to silicone elastomers based upon vinyl-containing polydiorganosiloxane polymers, organohydrogensiloxanes containing silicon-bonded hydrogen atoms, and platinum group containing catalysts are well known in the art of silicone elastomer compositions. The silicone elastomers which such compositions yield upon cure are well known for their high swell and high weep properties.

2

In U.S. Pat. No. 3,249,581, which issued on May 3, 1966, Nelson teaches a compositions consisting essentially of a vinyl-containing siloxane copolymer, a silicon-bonded hydrogen atom containing siloxane polymer, a liquid alpha-olefin having the formula $QQ'C=CH_2$, where Q is a hydrocarbon radical and Q' is a hydrogen atom or an alkyl group, a platinum catalyst and a filler.

In U.S. Pat. No. 4,322, 518, which issued on Mar. 30, 1982, Blizzard teaches a composition comprising (I) a liquid copolymeric organopolysiloxane prepared by forming a mixture of an organic solvent solution of a resinous copolymeric siloxane and a organohydrogensiloxane and then heating to remove the solvent; (II) a vinyl-containing polyorganosiloxane; an organohydrogensiloxane; and a curing catalyst.

In U.S. Pat. No. 4, 830,925, which issued on May 16, 1989, Swihart et al. teach a composition comprising a liquid copolymeric organopolysiloxane which is a blend of a resinous copolymeric siloxane and a liquid organohydrogenpolysiloxane; a vinyl-containing diorganopolysiloxane; a triorganosiloxy-endblocked diorganopolysiloxane, and a cure agent. Swihart et al. also teach a composition comprising a liquid copolymeric organopolysiloxane, a vinyl-containing diorganopolysiloxane, a triorganosiloxy-endblocked diorganopolysiloxane, a vinyl-containing organosilicon resin and a hydrosilylation catalyst.

In U.S. Pat. No. 4, 871,782, which issued on Oct. 3, 1989, Modic et al. teach a foamable composition comprising a vinyl-containing polysiloxane which contains a vinyl end-capped polysiloxane and a low viscosity vinyl-containing polysiloxane and a vinyl-containing polysiloxane resin, a hydride polysiloxane, a hydroxyl source and a platinum catalyst.

In a European Patent Application with Publication No. 0 509 515 Al, which was published on Oct. 21, 1992, Enami et al. teach a composition curable to a gel comprising an alkenyl-containing diorganopolysiloxane, an alkenyl-containing organopolysiloxane resin, an Si-H-terminated diorganopolysiloxane and a hydrosilylation catalyst.

In U.S. Pat. No. 5,164,461, which issued on Nov. 17, 1992, Mitchell et al. teach a composition comprising a vinyl-containing polyorganosiloxane composition comprising a vinyl-containing polyorganosiloxane and a solid, benzene-soluble vinyl-containing resin copolymer; a hydrogen-containing polysiloxane; a hydrosilation catalyst; an adhesion promoter, an extending filler and a reinforcing filler.

In U.S. Pat. No. 5,292,586, which issued on Mar. 8, 1994, Lin et al. teach a composition consisting essentially of a toluene soluble, resinous, hydroxyl-radical containing copolymer; an alkenyl-terminated polydiorganosiloxane; a hydride-terminated organohydrogenpolysiloxane; a hydrosilation catalyst and optionally an organic solvent.

In Japanese Kokai Patent Publication No. 07-216307, which was published on Aug. 15, 1995, the applicants teach a composition comprising an alkenyl-containing organopolysiloxane, a Si-H containing organopolysiloxane, an Si-H containing organopolysiloxane resin, a platinum catalyst and an alkenyl-containing organopolysiloxane resin.

In U.S. Pat. No. 5,574,073, which issued on Nov. 13, 1996, Juen et al. teach a composition comprising a vinyl-containing base polymer system, a silicon-containing crosslinker, a platinum group catalyst and a resinous organosiloxane copolymer.

After extensive investigation, the present inventors discovered that MQ resins can be added to organosiloxane compositions adapted for gasket use to produce new compositions which have reduced weep properties. The compositions of the present invention, unlike the compositions described above contain fluorine-atom modified MQ resins and yield upon cure, silicone elastomers having improved swell and weep properties.

One of the methods of sealing valve covers, rocker covers, oil pans, and such in automotive engines is through the use of cured-in-place gaskets. These gaskets are produced by extruding a bead of sealant material onto the part to be used and curing the material in place. Since the gasket will be exposed to oils and other hydrocarbon fluids and will be repeatedly heat-cycled as the engine is turned on and off, the weep properties of the material must be minimized. The compositions of the present invention, unlike the compositions described above contain fluorine-atom modified MQ resins and yield upon cure, silicone elastomers having improved swell and weep properties.

SUMMARY OF THE INVENTION

The present invention relates to an organosiloxane composition curable to a silicone elastomer having low weep properties. The organosiloxane composition comprises an alkenylcontaining polydiorganosiloxane, an organohydrogensiloxane having an average of at least two silicon-bonded hydrogen atoms per molecule, a platinum group catalyst and a fluorine atom-containing resinous organosiloxane copolymers. The present invention also relates to silicone elastomers prepared from such compositions. The present invention also relates to a method of reducing the leakage of a hydrocarbon fluid from a container by sealing the container with the silicone elastomer of the present invention.

DETAILED DESCRIPTION OF THE INVENTION

This invention relates broadly to an organosiloxane composition curable to a silicone elastomer comprising:

(A) an alkenyl-containing polydiorganosiloxane having an average of at least two silicon-bonded alkenyl groups per molecule;

(B) an organohydrogensiloxane having an average of at least two silicon-bonded hydrogen atoms per molecule, the amount of organohydrogensiloxane present being sufficient to provide a ratio of silicon-bonded hydrogen atoms in component (B) to silicon-bonded alkenyl groups in component (A) of 0.8:1 to 3:1;

(C) a platinum group catalyst sufficient for curing the organosiloxane composition; and (D) a resinous organosiloxane copolymer having at least one fluorine-containing group per molecule, an average of at least two alkenyl groups per molecule, a number average molecular weight (Mn) between about 400 and about 15,000 g/mole and having the empirical formula:

$(R_3SiO_{1/2})_a(R_2SiO_{2/2})_b(RSiO_{3/2})_c(SiO_{4/2})_d$ wherein a>0, d>0, b≧0, c>0, a+b+c+d=1.0≧(b+c)≧0.2, and R is a monovalent radical independently selected from the group consisting of hydrogen, hydroxyl, alkyl, alkenyl, alkoxy, —OZ and Z groups; wherein Z is a fluorine atom-containing group; and wherein the sum of the average number of silicon-bonded alkenyl groups per molecule in component (A) and the average number of silicon-bonded hydrogen atoms per molecule in component (B) is greater than four.

The Alkenyl-Containing Polydiorganosiloxane—Component (A)

Component (A) is an alkenyl-containing polydiorganosiloxane. It is the major component of the composition of the present invention. In order for the polymer to properly crosslink, an average of at least two alkenyl groups per molecule are needed. In preferred embodiments, component (A) contains alkenyl groups having from 2 to 12 carbon atoms. Preferred alkenyl groups are represented by theformula —R¹CH=CH₂, where R¹ represents a single bond or an alkylene group containing from 2 to 10 carbon atoms. The alkylene group can be linear or branched. Examples of preferred alkenyl groups include but are not limited to vinyl, 2-propenyl, 3-butenyl, 5-hexenyl, 7-octenyl and 10-undecenyl. More preferred alkenyl groups are vinyl and hexenyl. In preferred embodiments, at least one alkenyl group is located at the terminal of the molecule chain. In more preferred embodiments, at least two alkenyl groups at located at two of the terminals of the molecular chain.

In preferred embodiments, component (A) is represented by the general formula:

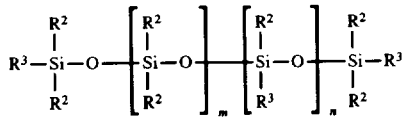

wherein each R² is individually selected from the group consisting of unsubstituted and substituted monovalent hydrocarbon groups containing from 1 to 20 carbon atoms; R³ is R² or an alkenyl group and m ≧0; and the value of n is selected such that component (A) has an average of at least two alkenyl groups per molecule. Preferably R² is an unsubstituted monovalent hydrocarbon group having less than 7 carbon atoms or a halogenated alkyl group having less than 7 carbon atoms. More preferably R² is alkyl group, such as methyl or ethyl, a cycloalkyl group such as cyclohexyl, aryl group, such as phenyl, or a substituted alkyl group, such as chloromethyl, 3-chloropropyl or 3,3,3-trifluoropropyl. Most preferably, R² is methyl. In preferred embodiments, n is zero.

Generally the siloxane is polymerized to a viscosity of from 0.1 to 500 Pa.s at 25° C., preferably from 1 to 100 Pa.s. It is possible to use either higher or lower viscosity polymers.

The alkenyl-containing polydiorganosiloxane of the present invention may be a homopolymer, or a copolymer. A single alkenyl-containing polydiorganosiloxane can be used or a mixture of different alkenyl-containing polydiorganosiloxanes.

Methods for preparing the alkenyl-containing polydiorganosiloxanes of component (A) are sufficiently disclosed in the patent and other literature such that a detailed description in this specification is not necessary.

The Organohydrogensiloxane—Component (B)

Component (B) of the present invention is an organohydrogensiloxane containing an average of at least two silicon bonded hydrogen atoms per molecule. It is used to crosslink the composition of the present invention. The silicone bonded hydrogen atoms in component (B) react with the alkenyl groups in component (A) in order to cure the composition of the present invention. In order for the composition of the present invention to cure to a silicone elastomer, the sum of the average number of silicon-bonded alkenyl groups per molecule in component (A) and the average number of silicon-bonded hydrogen atoms in component (B) must be greater than 4.

Organohydrogensiloxanes that may be used a component (B) preferably contain an average of more than two silicon-bonded hydrogen atoms per molecule, and more preferably contain an average of at least three silicon-bonded hydrogen atoms per molecule. The remaining valances on the silicon atoms are satisfied with organic groups selected from alkyl groups having less than 7 carbon atoms, halogenated alkyl groups having less than 7 carbon atoms and phenyl groups. Preferred alkyl groups are methyl, ethyl, and hexyl. Most preferred alkyl groups are methyl groups. Preferred halogenated alkyl groups are perfluorobutylethyl and 3,3,3,-trifluoropropyl groups.

The organohydrogensiloxane of component (B) can have a linear or branched structure, and can be a homopolymer, a copolymer, or a mixtures of these types of polymers.

A preferred linear type of organohydrogensiloxane has a viscosity of from 0.01 to 10 Pa.s at 25° C. and comprises dialkyisiloxane and alkylhydrogensiloxane units with trialkylsiloxy terminal units. The alkyl groups contain from 1 to 4 carbon atoms and are most preferably methyl. In preferred embodiments, component (B) comprises two types of organohydrogensiloxanes, one of which is a polymethylhydrogensiloxane and the other of which is a copolymer containing methylhydrogensiloxane and dimethylsiloxane units. Component (B) is present in an amount ranging from 0.5 to 100 parts by weight per 100 parts of component (A). In preferred embodiments, component (B) is present in an amount ranging from 1 to 25 parts per 100 parts of component (A). In more preferred embodiments, component (B) is present in an amount ranging from 1 to 10 parts per 100 parts of component (A).

The molar ratio of silicon-bonded hydrogen atoms to vinyl or other ethylenically unsaturated hydrocarbon groups in compositions curable by a hydrosilation reaction is important with respect to the properties of the cured elastomer. The optimum ratio for the present curable compositions will be determined at least in part by the molecular weight of the alkenyl-containing polydiorganosiloxane and the type of curing agent. An effective molar ratio of silicon-bonded hydrogen atoms to silicon-bonded alkenyl groups is in the range of 0.8:1 to 3:1, with a preferred range of 1.2:1 to 1.69:1.

The Platinum-Group Catalyst—Component (C)

Component (C) is a metal from the platinum group of the periodic table or a compound of such a metal. These metals include platinum, palladium and rhodium. Platinum and platinum compounds are preferred based on the high activity level of these catalysts in hydrosilylation reactions. Catalysts that may be used as component (C) in the organosiloxane composition of the present invention are any of the known forms that are effective in promoting the reaction of -SiH groups with silicon-bonded alkenyl groups. Suitable forms of platinum include but are not limited to chloroplatinic acid, platinum compounds and complexes of platinum compounds with unsaturated organic compounds or with siloxanes having silicon-bonded groups containing ethylencially unsaturated groups. Additional examples of suitable platinum catalysts include complexes of platinous halides or chloroplatinic acid with divinyldisiloxane and tetramethyldisiloxane. Suitable platinum catalysts are described in U.S. Pat. No. 3,419,593, which issued on Dec. 31, 1968, which is incorporated herein by reference for what it teaches about the preparation of such catalysts.

The concentration of component (C) in the present composition is equivalent to a platinum concentration of from 0.1 to 500 parts by weight of platinum metal, preferably from 5 to 100 parts by weight of platinum metal, per million parts (ppm), based on the combined weights of components A and B.

The Fluorinated MQ Resin—Component (D)

Component (D) is a resinous organosiloxane copolymer having an average of at least two alkenyl groups per molecule, a number average molecular weight (Mn) between about 400 and about 15,000, and having the empirical formula:

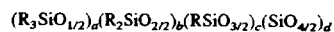

wherein a>0, d>0, b≧0, c≧0, a+b+c+d=1.0≦(b+c)≦0.2 and R is a monovalent radical independently selected from the group consisting of hydrogen, hydroxyl, alkyl, alkenyl, alkoxy, —OZ and Z groups; wherein Z is a fluorine atom-containing group. In preferred embodiments, the fluorine-containing group Z is bonded to a silicon atom on a M unit via an oxygen atom. Preferred alkyl groups are methyl and ethyl. The preferred alkenyl group is vinyl. The preferred alkoxy groups are methoxy and ethoxy. The —OZ group is selected from the group consisting of radicals having the general formula:

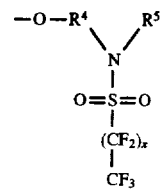

and radicals having the general formula:

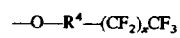

wherein $R^4$ is an alkylene group having 2 to 6 carbon atoms and $0≦x≦12$ and $R^5$ is an alkyl group having 1 to 6 carbon atoms. In preferred embodiments, the value of x is from 3 to 11. More preferably, the value of x is from 3 to 7.

The resinous organosiloxane of component (D) must contain an average of at least two alkenyl groups per molecule. In preferred embodiments, component (D) contains an average of 2–6 vinyl groups per molecule. In more preferred embodiments, component (D) has 4–6 vinyl groups per molecule.

The resinous organosiloxane of component (D) must contain an average of at least two alkenyl groups per molecule. In preferred embodiments, component (D) contains an average of 2–6 vinyl groups per molecule. In more preferred embodiments, component (D) has 4–6 vinyl groups per molecule.

In preferred embodiment of the present invention, component (D) is present in an amount ranging from about 0.5 to 50 parts by weight per 100 parts of component (A). In more preferred embodiment, component (D) is present in an amount ranging from 0.5 to 30 parts by weight per 10 100 parts of the organosiloxane composition. In most preferred embodiment, component (D) is present in an amount ranging from 1 to 15 parts by weight per 100 parts of the organosiloxane composition.

The resinous organosiloxane copolymer D has a number average molecular weight (Mn) between about 400 and about 15,000 g/mole, and preferably between about 400 and 7,500 g/mole and most preferably between 400 and 4000 g/mole. When Mn is greater than about 15,000, the resins begin to lose their solubility in most solvents and tend to include significant amounts of gel.

Regardless of the other R groups present in component (D), it is preferred that at least sixty mole percent of the monovalent organic groups associated with the resinous organosiloxane copolymer are methyl groups.

The ratio of M units to Q units is component (D) is from 0.8:1 to 4:1. In preferred embodiments, the ratio is from 1.6:1 to 4:1. In more preferred embodiments the ratio is from 2:1 to 4:1.

MQ silicone resins are generally produced in such a manner that the resin macromolecules 5 are dissolved in a solvent, which is typically, but not always, an aromatic solvent. Thus, as used herein, the term "solventless" means that substantially all the liquid solvent has been removed from the "solid" resin phase. It is known in the art to produce solventless forms of silicone resins.

The aforementioned values assigned to a, b, c and d define the "MQ" nature of the resins used to practice the present invention and distinguish them from silsesquioxane-type resins.

Optional Ingredients

Mixtures of the aforementioned polydiorganosiloxane, crosslinking agent, platinum catalyst and MQ resin may begin to cure at ambient temperatures. To obtain a longer working time or "pot life", the activity of the catalyst under ambient conditions can be retarded or suppressed by addition of a suitable inhibitor. Known inhibitors include the acetylenic compounds disclosed in U.S. Pat. No. 3,445,420, issued May 20, 1969. Acetylenic alcohols such as 2-methyl-3-butyn-2-ol and ethynyl cyclohexanol constitute a preferred class of inhibitors that will suppress the activity of a platinum-containing catalyst at 25° C., but cure rapidly at temperatures of 70° C. or higher.

Examples suitable inhibitors include ethylenically or aromatically unsaturated amides, acetylenic 2 0 compounds including acetylenic alcohols and silylated acetylenic alcohols, ethylenically unsaturated isocyanates, olefinic siloxanes, unsaturated hydrocarbon diesters, conjugated ene-ynes, cyclic siloxanes, hydroperoxides, nitrites, and diairdines.

Preferred inhibitors include acetylenic alcohols such as those disclosed in U.S. Pat. No. 3,445,420, including ethynylcyclohexanol and methylbutynol, unsaturated carboxylic esters such as diallyl maleate and dimethyl maleate, maleates and fumarates such as those disclosed in U.S. Pat. Nos. 4,562,096 and 4,774,111, including diethyl fumarate, diallyl fumarate, and bis-(methoxyisopropyl) maleate, conjugated ene-ynes such as those disclosed in U.S. Pat. Nos. 4,465,818, 4,472,563, and 4,559,396, and cyclic siloxanes such as methylvinyltetracyclosiloxane and methylvinylpentacyclosiloxane. The above-mentioned patents are incorporated herein by reference to teach how to prepare compounds which are suitable for use as an inhibitor in the compositions of this invention. Maleates, fumarates, acetylenic alcohols, silylated acetylenic alcohols, conjugated ene-ynes, and cylic siloxanes are the preferred inhibitors for the compositions of this invention.

In order to obtain satisfactory levels of physical strength, compositions of polydiorganosiloxane are commonly reinforced with one or more fillers such as, for example, fumed silica. Any finely divided form of silica can be used as a reinforcing filler. Colloidal silicas are preferred because of their relatively high surface area, which is typically at least 50 square meters per gram. Fillers having surface areas of at least 250 square meters per gram are preferred for use in the present method. Colloidal silicas can be prepared by precipitation or a fume process. Both of these preferred types of silica are commercially available.

The amount of finely divided silica used in the present compositions is at least in part determined by the physical properties desired in the cured elastomer. Liquid or pumpable polyorganosiloxane compositions typically contain from about 10 to about 60 percent by weight of silica, based on the weight of polydiorganosiloxane. This value is preferably from about 30 to about 50 percent.

Typically, the reinforcing filler is modified with silica treating agents to prevent a phenomenon referred to as "creping" or "crepe hardening" during processing of the curable composition. Preferably, a portion of the silica treating agent contains at least one silicon-bonded alkenyl group per molecule. These silica treating agents are typically liquid hydroxyl terminated polydiorganosiloxanes containing an average of from 2 to about 20 repeating units and at least one alkenyl group per molecule. They include, for example, organosilicon compounds such as hexaorganodisiloxanes and hexaorganodisilazanes that contain at least one alkenyl group per molecule and hydrolyze under the conditions used to treat the silica to form compounds with silicon-bonded hydroxyl groups. Small amounts of water are often added to the composition during the filler treatment step to facilitate the process.

Preferably at least a portion of the silicon-bonded hydrocarbon groups other than alkenyl that are present on the silica treating agent are identical to a majority of the hydrocarbon groups present in the polydiorganosiloxane. The alkenyl groups on the silica treating agent are preferably vinyl, particularly when alkenyl groups containing at least four carbon atoms are present on the polydiorganosiloxane. It is believed that silica treating agents function by reacting with silicon-bonded hydroxyl groups present on the surface of the silica particles to reduce interaction between these particles and the polydiorganosiloxanes.

The filler can also be a non-reinforcing or extending filler of finely ground particles of oxides or hydroxides or carbonates of such as silicon, calcium, magnesium, barium, or zinc, with silicon oxide (quartz) and calcium carbonate as preferred non-reinforcing fillers. Suitable fillers for silicone elastomeric compositions are well known in the art.

To enhance the adhesion of the cured elastomer to a substrates, the organosiloxane composition of the present invention may also contain an adhesion promoter.

In addition to the fluorinated MQ resins identified as component (D) above, the composition of the present invention may also contain one or more MQ resins that are free of fluorine atom containing groups.

The compositions of this invention can be prepared by a simple mixing of the components and any optional ingredients. However, when reinforcing fillers are included, the fillers are often treated in situ by first combining the polydiorganosiloxane, filler, filler treating agents and enough water to facilitate the filler treating process and then heating the mixture. For example, heating for 1 to 4 hours a about 170° C. has been found to provide good filler treatment. The heating may also be conducted at reduced pressure to assist in removing any excess water and the ammonia formed in the process. After filler treatment is completed the remaining components are simply mixed into the composition. The equipment needed for the mixing depends upon the viscosity of the polydiorganosiloxane used and the amoun of filler.

When the components of the present invention, and an optional ingredients are mixed together, the compositio will begin to cure unless a cure inhibitor is present. If th composition is not to be used immediately after mixing, i should be prepared in at least two parts. If the organohy drogensiloxane is placed in one part and the platinur catalyst is placed in another part, the individual parts will b shelf stable. The amounts of polydiorganosiloxane, organohydrogensiloxane and filler that are placed in each part can be varied to obtain the desired result. A convenient system distributes the ingredients into two parts so that the polydiorganosiloxane and filler are divided equally between the two parts. The organohydrogensiloxane is added to one part and the platinum catalyst is added to the other part. This results in a two-part system where the two part are mixed together in equal amounts and the consistency of the two parts is about the same so that they can be easily mixed at the time of use.

Other proportions of the ingredients can of course be used, as well as more than two parts if desired.

For application, the two parts of the composition may be mixed together and extruded into place on a substrate as a bead to form a gasket. After the gasket is formed on the substrate, it may be allowed to cure at ambient temperatures or it may be heated to accelerate the cure. In an alternative application method, the two parts of the composition may be mixed together and then placed in a mold, cured and then demolded.

The present invention also relates to a silicone elastomer that is prepared by (I) preparing an organosiloxane composition comprising:
- (A) an alkenyl-containing polydiorganosiloxane having an average of at least two silicon-bonded alkenyl groups per molecule;
- (B) an organohydrogensiloxane having an average of at least two silicon-bonded hydrogen atoms per molecule, the amount of organohydrogensiloxane present being sufficient to provide a ratio of silicon-bonded hydrogen atoms in component (B) to silicon-bonded alkenyl groups in component (A) of 0.8:1 to 3:1;
- (C) a platinum group catalyst sufficient for curing the organosiloxane composition; and
- (D) a resinous organosiloxane copolymer having at least one fluorine atom-containing group per molecule, an average of at least two alkenyl groups per molecule, a number average molecular weight (Mn) between about 400 and about 15,000, and the empirical formula:

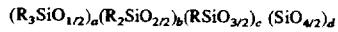

wherein a>0, d>0, b≧0, c≧0, a+b+c+d=1.0≦(b+c)≦0.2, and R is a monovalent radical independently selected from the group consisting of hydrogen, hydroxyl, alkyl, alkenyl, alkoxy, —OZ and Z, wherein Z is a fluorine atom-containing group; and wherein the sum of the average number of silicon-bonded alkenyl groups per molecule in component (A) and the average number of silicon-bonded hydrogen atoms per molecule in component (B) is greater than four; and (II) allowing the organosiloxane composition to cure.

Components A, B, C, and D are as described above. The organosiloxane composition may also include optional ingredients as described above. The organosiloxane composition may be allowed to cured at ambient conditions, at elevated temperatures, and/at elevated pressures.

The present invention also relates to a method of minimizing the leakage of hydrocarbon fluid from a container by sealing the container with the organosiloxane composition or the silicone elastomer of the present invention. In one embodiment, the method comprises the steps of (I) preparing an organosiloxane composition comprising:
- (A) an alkenyl-containing polydiorganosiloxane having an average of at least two silicon-bonded alkenyl groups per molecule;
- (B) an organohydrogensiloxane having an average of at least two silicon-bonded hydrogen atoms per molecule, the amount of organohydrogensiloxane present being sufficient to provide a ratio of silicon-bonded hydrogen atoms in component (B) to silicon-bonded alkenyl groups in component (A) of 0.81 to 3:1;
- (C) a platinum group catalyst sufficient for curing the organosiloxane composition; and
- (D) a resinous organosiloxane copolymer having at least one fluorine atom-containing group per molecule, an average of at least two alkenyl groups per molecule, a number average molecular weight (Mn) between about 400 and about 15,000 g/mole and the empirical formula:

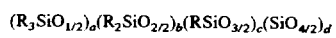

wherein a>0, d>0, b≧0, c≧0, a+b+c+d=1.0≦(b+c)≦0.2, and R is a monovalent radical independently selected from the group consisting of hydrogen, hydroxyl, alkyl, alkenyl, alkoxy, —OZ and Z; wherein Z is a fluorine atom-containing group; and wherein the sum of the average number of silicon-bonded alkenyl groups per molecule in component (A) and the average number of silicon-bonded hydrogen atoms per molecule in component (B) is greater than four; and (II) sealing the containing by
- (i) applying the organosiloxane composition to a surface on the container; and
- (ii) allowing the composition to cure.

In an alternative embodiment, the method comprises the steps of (I) preparing an organosiloxane composition comprising:
- (A) an alkenyl-containing polydiorganosiloxane having an average of at least two silicon- bonded alkenyl groups per molecule;
- (B) an organohydrogensiloxane having an average of at least two silicon-bonded hydrogen atoms per molecule, the amount of organohydrogensiloxane present being sufficient to provide a ratio of silicon-bonded hydrogen atoms in component (B) to silicon-bonded alkenyl groups in component (A) of 0.8:1 to 3:1;
- (C) a platinum group catalyst sufficient for curing the organosiloxane composition; and
- (D) a resinous organosiloxane copolymer having at least one fluorine atom-containing group per molecule, an average of at least two alkenyl groups per molecule, a number average molecular weight (Mn) between about 400 and about 15,000 g/mole and the empirical formula:

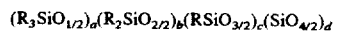

wherein a>0, d>0, b≧0, c≧0, a+b+c+d=1.0≦(b+c)≦0.2, and R is a monovalent radical independently selected from the group consisting of hydrogen, hydroxyl, alkyl, alkenyl, alkoxy, —OZ and Z; wherein Z is a fluorine atom-containing group; and wherein the sum of the average number of silicon-bonded alkenyl groups per molecule in component (A) and the average number of silicon-bonded hydrogen atoms per molecule in component (B) is greater than four;
(II) allowing the composition to cure to a silicone elastomer; and
(III) sealing the container by securing the cured elastomer to a surface on the container.

The surface on the container can be a small opening that can be sealed by applying the composition of the present invention or by adhering the silicone elastomer that results when the composition of the present invention is cured. The surface can also be a surface on the container that mates with a cover or a lid for the container. The surface can also be a cover or a lid for the container. The organosiloxane composition or the cured silicone elastomer be applied to the lid or cover before the lid or cover is placed on the container.

Components A, B, C, and D and methods for curing the organosiloxane composition are as described above

EXAMPLES

The following examples are included for illustrative purposes only and should not be construed as limiting the invention which is properly set forth in the appended claims. All parts and percentages in the examples are by weight and viscosities were measured at 25° C. The organosiloxane compositions of the Examples and the Comparative Examples were prepared as follows: The composition of the Comparative Example 1 was prepared by preparing Part A and Part B. Part A was prepared by mixing a portion of the dimethylvinylsiloxy-terminated polydimethylsiloxane and the next listed 7 ingredients of Part A and heating the mixture using 150 psi (1034 MPa.) of steam under a 15 inch (38 mm Hg) vacuum. The mixture was then stripped to remove water, ammonia and some cyclic siloxane components. The remaining dimethylvinylsiloxy-terminated polydimethylsiloxane and the calcium hydroxide was then admixed. The mixture was then allowed to cool to below 100° C. and the remaining ingredients were admixed. Part B was prepared by mixing a portion of the dimethylvinylsiloxy-terminated polydimethylsiloxane and the next listed 7 ingredients of Part B and heating the mixture using 150 psi (1034 MPa.) of steam under a 15 inch (38 mm Hg) vacuum. The mixture was then stripped to remove the water, ammonia and some of the cyclic siloxane components. The remaining dimethylvinylsiloxy-terminated polydimethylsiloxane was then admixed. The mixture was then allowed to cool to below 100° C. and the remaining ingredients were admixed.

A silicone elastomer was prepared from each of the compositions of the Examples and Comparative Examples by admixing Part A and the corresponding part B, and curing the compositions, at 150° C. for the time listed on Tables 1 or 2. Approximately 0.5 grams of the mixture of Parts A and B for each of the Examples and Comparative Examples were placed on a steel slide. The composition was cured by placing the steel slide containing the composition into an oven at 150° C. for the number of minutes listed on Tables 1.

The swell and weep properties of the silicone elastomers were determined according to the following method. Before the organosiloxane composition was applied to the steel slide, the slide was weighed. The weight of the steel slide was recorded as $W_1$. After the organosiloxane composition was applied to the steel slide and cured, the weight of the cured elastomer and steel slide, $W_2$ was determined. The slide and cured elastomer were immersed in a hydrocarbon fluid for the number of hour listed on Table 1 under "Swell Time". The hydrocarbon fluid was Mobil ® 5W30 SG oil. "MOBIL" is, a registered trademark of Mobil Oil Corporation of Fairfax, Va. The steel slide containing the cured silicone elastomer was then removed from the hydrocarbon fluid and the excess fluid was wiped from the slide and the elastomer. The slide and elastomer were then weighed, and the weight was recorded as $W_3$. The slide and the elastomer were allowed to set at room temperature for the number of hours listed on Table 1 as "Weep Time". The excess hydrocarbon fluid which had bleed from the silicone elastomer during the "Weep Time" was wiped off the steel slide and silicone elastomer. The steel slide and the elastomer were then weighed, and the weight was recorded as $W_4$. The % swell at elevated temperature was calculated as follows:

% swell at elevated temperature=$((W_3-W_1)-(W_2-W_1))/(W_2-W_1)$.

The % swell at ambient temperature was calculated as follows:

% swell at ambient temperature=$((W_4-W_1)-(W_2-W_1))/(W_2-W_1)$.

The weep number (Weep #) was calculated as follows:

Weep #=% swell at elevated temperature−% swell at ambient temperature.

Percent swell and weep numbers are recorder in Table 1.

COMPARATIVE EXAMPLE 1

Part A 49 parts by weight of a liquid dimethylvinylsiloxy-terminated polydimethylsiloxane having a viscosity of about 55,000 mPa.s at 25° C.

3.69 parts by weight of a dimethylhexenylsiloxy-terminated dimethysiloxane:methylhexenylsiloxane copolymer having a viscosity of 420 rmn²/s.

0.13 parts by weight of tetramethyldivinyldisilazane 6.15 parts by weight of hexamethyldisilazane 0.52 parts by weight of a hydroxyl-terminated polydimethylsiloxane fluid having a viscosity of approximately 41 mm²/s at 25° C.; with a hydroxyl content of approximately 3.1 wt %.

10.5 parts by weight of quartz having a typical particle size of less than 5 microns.

18.4 parts by weight of amorphous silica having an average surface area of 400 m²/g.

3.1 parts by weight water 0.35 parts chloroplatinic acid complex of divinyltetramethyldisiloxane diluted with dimethylvinylsiloxy end-blocked polydimethylsiloxane to provide 0.65 weight percent platinum 2.11 parts by weight calcium hydroxide 0.018 parts by weight toluene 3.34 parts by weight of a mixture containing 40% by weight of carbon black and 60% by weight of trimethylsiloxy-terminated dimethylsiloxane.

0.001 parts by weight aluminum acetylacetonate 2.05 parts by weight of 20 wt % copper phthacyanine, and 25 wt % carbon black in dimethylvinylsiloxy-terminated dimethylsiloxane.

Part B 52.4 parts by weight of a liquid dimethylvinylsiloxy terminated polydimethylsiloxane having a viscosity of about 55,000 mPa.s at 25° C.

3.94 parts by weight a dimethylhexenylsiloxy-terminated dimethylsiloxane:methylhexenyl-siloxane copolymer having a viscosity of 420 mm²/s at 25° C.

0.14 parts by weight of tetramethyldivinyldisilazane 6.57 parts by weight of hexamethyldisilazane 11.3 parts by weight of quartz having a typical particle size of less than 5 microns.

19.71 parts by weight of amorphous silica having an average surface area of 400 m²/g.

3.3 parts by weight of water 0.04 parts by weight of I-ethynyl-I-cyclohexanol 99%

0.56 parts by weight of a hydroxyl-terminated polydimethylsiloxane fluid having a viscosity of approximately 41 mm²/s at 25° C.; with a hydroxyl content of approximately 3.1 wt %.

1.97 parts by weight of dimethylsiloxane:methylhydrogensiloxane copolymer with methyl silsesquioxane having a silicon-bonded hydrogen content of approximately 0.81 wt %.

0.3 parts by weight of gamma-glycidoxypropyltrimethoxysilane

COMPARATIVE EXAMPLE 2

Part A 25.00 g of Part A of Comparative Example 1

Part B 25.00 g of Part B of Comparative Example 1

EXAMPLE 1

Part A 31.09 g of Part A of Comparative Example 1.

Part B 31.09 g of Part B of Comparative Example 1.

3.67 g of a fluorine atom-containing MQ having the general formula

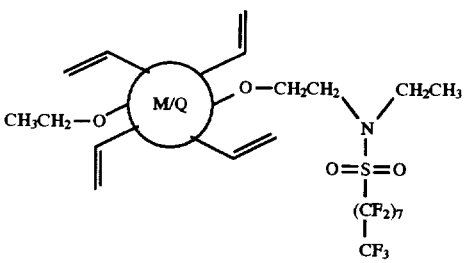

(hereinafter "FMQ1"). FMQ1 was prepared as follows. An ethoxylated MQ resin, having a Mn of 1427, an average of approximately 4 vinyl groups per molecule, and an average of approximately 0.6 ethoxy groups per molecule was prepared according to the method of U.S. Pat. No. 5,391,673. A flask was charged with 77.30 g of this ethoxylated M/Q resin and 50.06 g perfluoroalkylsulfonamido(N-ethyl)ethyl alcohol. The mixture was heated to 70° C. at which time 1.35 g tetrabutyltitanate (TBT) was added. The temperature was increased to 100° C. for 2 h, then increased to 140° C. for 1 h, and then was maintained at 120° C. for 1 h before an additional 0.6 g of TBT was added. The reaction was allowed to proceed for an additional 4.5 h before being stopped.

3.12 g of trimethylsiloxy-terminated methylperfluorobutylethylsiloxane: methylhydrogensiloxane copolymer having approximately 2.3 methylhydrogensiloxane units per methylperfluorobutylethylsiloxane units.

0.135 g of a chloroplatinic acid complex of divinyltetramethyldisiloxane diluted with dimethylvinylsiloxy endblocked polydimethylsiloxane to provide 0.7 weight percent platinum.

0.071 g of bis(methoxymethylethyl)maleate.

EXAMPLE 2

Part A 23.91 g of Part A of Comparative Example 1.

Part B 23.91 g of Part B of Comparative Example 1.

6.35 g of FMQ1.

5.4 g of trimethylsiloxy-terminated methylperfluorobutylethylsiloxane: methylhydrogensiloxane copolymer having approximately 2.3 methylhydrogensiloxane units per methylperfluorobutylethylsiloxane units.

0.233 g of a chloroplatinic acid complex of divinyltetramethyldisiloxane diluted with dimethylvinylsiloxy endblocked polydimethylsiloxane to provide 0.7 weight percent platinum.

0.124 g of bis(methoxymethylethyl)maleate.

EXAMPLE 3

Part A 18.08 g of Part A of Comparative Example 1.

Part B 18.08 g of Part B of Comparative Example 1.

8.24 g of FMQ1.

7.0 g of trimethylsiloxy-terminated methylperfluorobutylethylsiloxane: methylhydrogensiloxane copolymer having approximately 2.3 methylhydrogensiloxane units per methylperfluorobutylethylsiloxane units.

0.302 g of a chloroplatinic acid complex of divinyltetramethyldisiloxane diluted with dimethylvinylsiloxy endblocked polydimethylsiloxane to provide 0.7 weight percent platinum.

0.16 g of bis(methoxymethylethyl)maleate.

EXAMPLE 4

Part A 14.85 g of Part A of Comparative Example 1.

Part B 14.85 g of Part B of Comparative Example 1.

10.57 g of FMQ1.

8.98 g of trimethylsiloxy-terminated methylperfluorobutylethylsiloxane: methylhydrogensiloxane copolymer having approximately 2.3 methylhydrogensiloxane units per methylperfluorobutylethylsiloxane units.

0.387 g of a chloroplatinic acid complex of divinyltetramethyldisiloxane diluted with dimethylvinylsiloxy endblocked polydimethylsiloxane to provide 0.7 weight percent platinum 0.205 g of bis(methoxymethylethyl)maleate.

EXAMPLE 5

Part A 12.47 g of Part A of Comparative Example 1.

Part B 12.47 g of Part B of Comparative Example 1.

13.23 g of FMQ1.

11.24 g of trimethylsiloxy-terminated methylperfluorobutylethylsiloxane: methylhydrogensiloxane copolymer having approximately 2.3 methylhydrogensiloxane units per methylperfluorobutylethylsiloxane units.

0.485 g of a chloroplatinic acid complex of divinyltetramethyldisiloxane diluted with dimethylvinylsiloxy endblocked polydimethylsiloxane to provide 0.7 weight percent platinum.

0.257 g of bis(methoxymethylethyl)maleate.

EXAMPLE 6

Part A 29.57 g of part A of Comparative Example 1

Part B 29.57 g of Part B of Comparative Example 1.

2.88 g a fluorine atom-containing MQ resin having a Mn of approximately 5000, approximately 4 vinyl groups per molecule and having the general formula

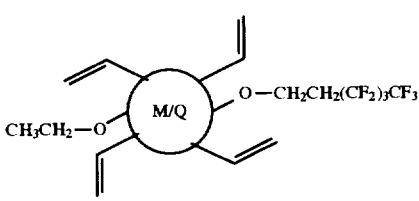

(hereinafter "FMQ2"). FMQ2 was prepared as follows. An ethoxylated MQ resin, having a Mn of 1427, an average of approximately 4 vinyl groups per molecule, and an average of approximately 0.6 ethoxy groups per molecule was prepared according to the method of U.S. Pat. No. 5,391,673. A flask was charged with 20.00 g of this ethoxylated M/Q resin and 6.21 g perfluorobutylethanol. The mixture was heated to heated to 120° C. at which time 0.262 g TBT was added. The reaction was allowed to proceed for an additional 12 h.

1.28 g of trimethylsiloxy-terminated methylperfluorobutylethylsiloxane:

methylhydrogensiloxane copolymer having approximately 2.3 methylhydrogensiloxane units per methylperfluorobutylethylsiloxane units.

0.067 g of a chloroplatinic acid complex of divinyltetramethyldisiloxane diluted with dimethylvinylsiloxy endblocked polydimethylsiloxane to provide 0.7 weight percent platinum.

0.039 g of bis(methoxymethylethyl)maleate.

EXAMPLE 7
Part A
21.91 g of Part A of Comparative Example 1.
Part B
21.91 g of Part B of Comparative Example 1.
2.39 g of FMQ2-type resin having a molecular weight of approximately 1620.
2.48 g of trimethylsiloxy-terminated methylperfluorobutylethylsiloxane: methylhydrogensiloxane copolymer having approximately 2.3 methylhydrogensiloxane units per methylperfluorobutylethylsiloxane units.
0.097 g of a chloroplatinic acid complex of divinyltetramethyldisiloxane diluted with dimethylvinylsiloxy endblocked polydimethylsiloxane to provide 0.7 weight percent platinum.
0.048 g of bis(methoxymethylethyl)maleate.

EXAMPLE 8
Part A
6.73 g of part A of Comparative Example 1.
Part B
6.73 g of Part B of Comparative Example 1.
0.75 g of FMQ2-type resin having a molecular weight of approximately 1620.
0.78 g of trimethylsiloxy-terminated methylperfluorobutylethylsiloxane: methylhydrogensiloxane copolymer having approximately 2.3 methylhydrogensiloxane units per methylperfluorobutylethylsiloxane units.
0.002 g of a chloroplatinic acid complex of divinyltetramethyldisiloxane diluted with dimethylvinylsiloxy endblocked polydimethylsiloxane to provide 0.7 weight percent platinum.
0.001 g of bis(methoxymethylethyl)maleate.

EXAMPLE 9
Part A
20.76 g of Part A of Comparative Example 1.
Part B
20.76 g of Part B of Comparative Example 1.
4.55 g of FMQ2.
2.02g of trimethylsiloxy-terminated methylperfluorobutylethylsiloxane: methylhydrogensiloxane copolymer having approximately 2.3 methylhydrogensiloxane units per methylperfluorobutylethylsiloxane units.
0.106 g of a chloroplatinic acid complex of divinyltetramethyldisiloxane diluted with dimethylvinylsiloxy endblocked polydimethylsiloxane to provide 0.7 weight percent platinum.
0.062 g of bis(methoxymethylethyl)maleate.

EXAMPLE 10
Part A
19.31 g of Part A of Comparative Example 1.
Part B
19.31 g of Part B of Comparative Example 1.
4.74 g of a FMQ2-type resin having a molecular weight of approximately 1620.
4.91 g of trimethylsiloxy-terminated methylperfluorobutylethylsiloxane: methylhydrogensiloxane copolymer having approximately 2.3 methylhydrogensiloxane units per methylperfluorobutylethylsiloxane units.
0.193 g of a chloroplatinic acid complex of divinyltetramethyldisiloxane diluted with dimethylvinylsiloxy endblocked polydimethylsiloxane to provide 0.7 weight percent platinum.
0.096 g of bis(methoxymethylethyl)maleate.

EXAMPLE 11
Part A
16.72 g of Part A of Comparative Example 1.
Part B
16.72 g of Part B of Comparative Example 1.
6.28 g of FMQ2.
2.8 g of trimethylsiloxy-terminated methylperfluorobutylethylsiloxane: methylhydrogensiloxane copolymer having approximately 2.3 methylhydrogensiloxane units per methylperfluorobutylethylsiloxane units.
0.146 g of a chloroplatinic acid complex of divinyltetramethyldisiloxane diluted with dimethylvinylsiloxy endblocked polydimethylsiloxane to provide 0.7 weight percent platinum.
0.085 g of bis(methoxymethylethyl)maleate.

EXAMPLE 12
Part A
14.65 g of Part A of Comparative Example 1.
Part B
14.65 g of Part B of Comparative Example 1.
8.58g of FMQ2.
3.82 g of trimethylsiloxy-terminated methylperfluorobu tylethylsiloxane: methylhydrogensiloxane copolymer hav ing approximately 2.3 methylhydrogensiloxane units pe methylperfluorobutylethylsiloxane units.
0.199 g of a chloroplatinic acid complex of divinyltet ramethyldisiloxane diluted with dimethylvinylsiloxy end blocked polydimethylsiloxane to provide 0.7 weight percen platinum.
0.116 g of bis(methoxymethylethyl)maleate.

EXAMPLE 13

Part A 12.49 g of Part A of Comparative Example 1.

Part B 12.49 g of Part B of Comparative Example 1.

10.87 g of FMQ2.

4.84 g of trimethylsiloxy-terminated methylperfluorobutylethylsiloxane: methylhydrogensiloxane copolymer having approximately 2.3 methylhydrogensiloxane units per methylperfluorobutylethylsiloxane units.

0.252 g of a chloroplatinic acid complex of divinyltetramethyldisiloxane diluted with dimethylvinylsiloxy endblocked polydimethylsiloxane to provide 0.7 weight percent platinum.

0.147 g of bis(methoxymethylethyl)maleate.

(B) an organohydrogensiloxane having an average of at least two silicon-bonded hydrogen atoms per molecule, the amount of organohydrogensiloxane present being sufficient to provide a ratio of silicon-bonded hydrogen atoms in component (B) to silicon-bonded alkenyl groups in component (A) of 0.8:1 to 3:1;

(C) a platinum group catalyst sufficient for curing the organosiloxane composition; and (D) a resinous organosiloxane copolymer having at least one fluorine atom-containing group per molecule, an average of at least two alkenyl groups per molecule, a number average molecular weight (Mn) between about 400 and about 15,000 g/mole and having the empirical formula:

$$(R_3SiO_{1/2})_a(R_2SiO_{2/2})_b(RSiO_{3/2})_c(SiO_{4/2})_d$$

TABLE 1

Swell and Weep Properties of Silicone Elastomers Prepared From Compositions Containing Fluorinated-MQ Resins V. Silicone Elastomers Prepared From Compositions Without Such Resins.

|  | Comp. Ex.1 | Comp. Ex.2 | Ex. 13 | Ex. 14 | Ex. 15 | Ex. 16 | Ex. 17 | Ex. 18 |
|---|---|---|---|---|---|---|---|---|
| Wt % Resin | — | — | 5.32 | 10.66 | 16.03 | 21.46 | 26.77 | 4.38 |
| # vinyls/resin molecule | — | — | 4 | 4 | 4 | 4 | 4 | 4 |
| Type of Fluorinated Resin | — | — | FMQ1 | FMQ1 | FMQ1 | FMQ1 | FMQ1 | FMQ2 |
| Resin Molecular Weight | — | — | >1650 | >1650 | >1650 | >1650 | >1650 | >5000 |
| Cure Time (minutes) | 1440 | 12 | 1440 | 1440 | 1440 | 1440 | 1440 | 1440 |
| Swell Time (hours) | 48 | 51 | 48 | 48 | 48 | 48 | 48 | 48 |
| % swell at 150 C. | 27.7 | 29.2 | 23.8 | 20.9 | 18 | 19.3 | 14.4 | 23.7 |
| Weep Time (hours) | 24 | 39 | 24 | 24 | 24 | 24 | 24 | 24 |
| % swell at ambient | 20.2 | 18.1 | 21.5 | 18.1 | 15.6 | 15.3 | 11.7 | 19.3 |
| Weep # | 7.6 | 11.1 | 2.3 | 2.8 | 2.4 | 4 | 2.7 | 3.8 |

|  | Ex. 19 | Ex. 20 | Ex. 21 | Ex. 22 | Ex. 23 | Ex. 24 | Ex. 25 |
|---|---|---|---|---|---|---|---|
| Wt % Resin | 4.91 | 5.00 | 8.77 | 9.83 | 13.18 | 17.61 | 21.92 |
| # vinyls/resin molecule | 4 | 4 | 4 | 4 | 4 | 4 | 4 |
| Type of Fluorinated Resin | FMQ2 | FMQ2 | FMQ2 | FMQ2 | FMQ2 | FMQ2 | FMQ2 |
| Resin Molecular Weight | 1620 | 1620 | >5000 | 1620 | >5000 | >5000 | >5000 |
| Cure Time (minutes) | 960 | 12 | 1440 | 960 | 1440 | 1440 | 1440 |
| Swell Time (hours) | 48 | 56 | 48 | 48 | 48 | 48 | 48 |
| % swell at 150 C. | 23.3 | 24.3 | 21.4 | 21.3 | 19.1 | 16.6 | 14.4 |
| Weep Time (hours) | 48 | 48 | 24 | 48 | 24 | 24 | 24 |
| % swell at ambient | 21.4 | 20.4 | 17.1 | 19.3 | 15.6 | 14.7 | 11.5 |
| Weep # | 2 | 4 | 4.3 | 2 | 3.5 | 1.9 | 2.9 |

That which is claimed is:

1. An organosiloxane composition curable to a silicone elastomer, the composition comprising:

(A) an alkenyl-containing polydiorganosiloxane having an average of at least two silicon-bonded alkenyl groups per molecule;

wherein a>0, d>0, b≧0, c≧0, a+b+c+d=1.0≦(b+c)≦0.2, and R is a monovalent radical independently selected from the group consisting of hydrogen, hydroxyl, alkyl, alkenyl, alkoxy, —OZ and Z; wherein Z is a fluorine atom-containing group; and wherein the sum of the average number of silicon-bonded alkenyl groups per molecule in component (A) and the average number of silicon-bonded hydrogen atoms per molecule in component (B) is greater than four.

2. The organosiloxane composition of claim 1, wherein component (D) contains an average of at least one —OZ group per molecule.

3. The organosiloxane composition of claim 2, wherein the —OZ group is selected from the group consisting of radicals having the general formula:

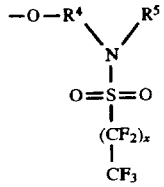

and groups having the general formula:

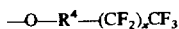

wherein $R^4$ is an alkylene group having 2 to 6 carbon atoms and $0 \leq x \leq 12$ and $R^5$ is an alkyl group having 1 to 6 carbon atoms.

4. The organosiloxane composition of claim 3, wherein $R^4$ is an alkylene group having 3 to 4 carbon atoms and $R^5$ is an alkyl group having 2 to 4 carbon atoms.

5. The organosiloxane composition of claim 3, wherein the value of x is from 3 to 11.

6. The organosiloxane composition of claim 5, wherein the value of x is from 3 to 7.

7. The organosiloxane composition of claim 1, wherein component (B) has silicon-bonded organic groups selected from the group consisting of alkyl groups having less than 7 carbon atoms and halogenated alkyl groups.

8. The organosiloxane composition of claim 7, wherein an average of at least one of the silicon-bonded organic groups of component (B) is a halogenated alkyl group.

9. The organosiloxane composition of claim 8, wherein at least one of the halogenated alkyl groups is selected from the group consisting of perfluorobutylethyl and 3,3,3,-trifluoropropyl.

10. The organosiloxane composition of claim 9, wherein at least one of the halogenated alkyl groups is perfluorobutylethyl.

11. The organosiloxane composition of claim 1, wherein the molar ratio of silicon-bonded hydrogen atoms in component (B) to silicon-bonded alkenyl groups in component (A) is in the range of 1.2:1 to 1.69:1.

12. The organosiloxane composition of claim 1, wherein component (D) is present in an amount ranging from 0.5 to 50 parts per 100 parts of component (A).

13. The organosiloxane composition of claim 12, wherein component (D) is present in an amount ranging from 0.5 to 30 parts per 100 parts of component (A).

14. The organosiloxane composition of claim 13, wherein component (D) is present in an amount ranging from 1 to 15 parts of component (A).

15. The organosiloxane composition of claim 1, wherein component (D) has an average of at least 2 vinyl groups.

16. The organosiloxane composition of claim 15, wherein component (D) has an average of from 4 to 6 vinyl group per molecule.

17. The organosiloxane composition of claim 1, wherein the Mn of component (D) is from 400 to 7,500 g/mole.

18. The organosiloxane composition of claim 17, wherein the Mn of component (D) is from 400 to 4000 g/mole.

19. The organosiloxane composition of claim 1, wherein the molar ratio of a to d is 1.6:1 to 4:1.

20. The organosiloxane composition of claim 19, wherein the molar ratio of a to d is 2:1 to 4:1.

21. The product comprising the incipient materials:
(A) an alkenyl-containing polydiorganosiloxane having an average of at least two silicon-bonded alkenyl groups per molecule;
(B) an organohydrogensiloxane having an average of at least two silicon-bonded hydrogen atoms per molecule, the amount of organohydrogensiloxane present being sufficient to provide a ratio of silicon-bonded hydrogen atoms in component (B) to silicon-bonded alkenyl groups in component (A) of 0.8:1 to 3:1;
(C) a platinum group catalyst sufficient for curing the organosiloxane composition; and
(D) a resinous organosiloxane copolymer having an at least one fluorine atom-containing group per molecule, an average of at least two alkenyl groups per molecule, a number average molecular weight (Mn) between about 400 and about 15,000 g/mole having the empirical formula:

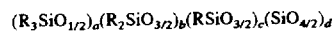

wherein $a>0$, $b \geq 0$, $c \geq 0$, $a+b+c+d=1$, $0 \leq (b+c) \leq 0.2$, and R is a monovalent radical independently selected from the group consisting of hydrogen, hydroxyl, alkyl, alkenyl, alkoxy, —OZ and Z; wherein Z is a fluorine atom-containing group; and wherein the sum of the average number of silicon-bonded alkenyl groups per molecule in component (A) and the average number of silicon-bonded hydrogen atoms per molecule in component (B) is great than four.

22. A silicone elastomer prepared by
(I) preparing an organosiloxane composition comprising:
(A) an alkenyl-containing polydiorganosiloxane having an average of at least two silicon-bonded alkenyl groups per molecule;
(B) an organohydrogensiloxane having an average of at least two silicon-bonded hydrogen atoms per molecule, the amount of organohydrogensiloxane present being sufficient to provide a ratio of silicon-bonded hydrogen atoms in component (B) to silicon-bonded alkenyl groups in component (A) of 0.8:1 to 3:1;
(C) a platinum group catalyst sufficient for curing the organosiloxane composition; and
(D) a resinous organosiloxane copolymer having at least one fluorine atom-containing group per molecule, an average of at least two alkenyl groups per molecule, a number average molecular weight (Mn) between about 400 and about 15,000 g/mole and having the empirical formula:

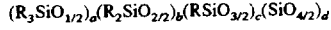

wherein $a>0$, $d>0$, $b \geq 0$, $c \geq 0$, $a+b+c+d=1.0 \leq (b+c) \leq 0.2$, and R is a monovalent radical independently selected from the group consisting of hydrogen, hydroxyl, alkyl, alkenyl, alkoxy, —OZ and Z; wherein Z is a fluorine atom-containing group; and wherein the sum of the average number of silicon-bonded alkenyl groups per molecule in component (A) and the average number of silicon-bonded hydrogen atoms per molecule in component (B) is greater than four
(II) allowing the organosiloxane composition to cure.

23. A method of minimizing the leakage of hydrocarbon fluid from a container, the method comprising the steps of
(I) preparing an organosiloxane composition comprising
(A) an alkenyl-containing polydiorganosiloxane having an average of at least two silicon-bonded alkenyl groups per molecule;

(B) an organohydrogensiloxane having an average of at least two silicon-bonded hydrogen atoms per molecule, the amount of organohydrogensiloxane present being sufficient to provide a ratio of silicon-bonded hydrogen atoms in component (B) to silicon-bonded alkenyl groups in component (A) of 0.8:1 to 3:1;

(C) a platinum group catalyst sufficient for curing the organosiloxane composition; and (D) a resinous organosiloxane copolymer having at least one fluorine atom-containing group per molecule, an average of at least two alkenyl groups per molecule, a number average molecular weight (Mn) between about 400 and about 15,000 g/mole and having the empirical formula:

$(R_3SiO_{1/2})_a(R_2SiO_{2/2})_b(RSiO_{3/2})_c(SiO_{4/2})_d$ wherein a>0, d>0, b≧0, c≧0, a+b+c+d=1.0≦(b+c)≦0.2, and R is a monovalent radical independently selected from the group consisting of hydrogen, hydroxyl, alkyl, alkenyl, alkoxy, —OZ and Z; wherein Z is a fluorine atom-containing group; and wherein the sum of the average number of silicon-bonded alkenyl groups per molecule in component (A) and the average number of silicon-bonded hydrogen atoms per molecule in component ( ) is greater than four;

(II) applying the organosiloxane composition to a surface on the container; and (III) allowing the composition to cure.

24. The method of claim 23, wherein the surface of step (II) contains a small opening which is capable of being filled by the organosiloxane composition.

25. The method of claim 23, wherein the surface of step (II) is a surface that mates with a cover or a lid for the container.

26. The method of claim 23, wherein the surface of step (II) is a surface on the container lid or cover.

27. A method of minimizing the leakage of hydrocarbon fluid from a container, the method comprising the steps of (I) preparing an organosiloxane composition comprising:
(A) an alkenyl-containing polydiorganosiloxane having an average of at least two silicon-bonded alkenyl groups per molecule;
(B) an organohydrogensiloxane having an average of at least two silicon-bonded hydrogen atoms per molecule, the amount of organohydrogensiloxane present being sufficient to provide a ratio of silicon-bonded hydrogen atoms in component (B) to silicon-bonded alkenyl groups in component (A) of 0.8:1 to 3:1;
(C) a platinum group catalyst sufficient for curing the organosiloxane composition; and
(D) a resinous organosiloxane copolymer having at least one fluorine atom-containing group per molecule, an average of at least two alkenyl groups per molecule, a number average molecular weight (Mn) between about 400 and about 15,000 g/mole and having the empirical formula:

$(R_3SiO_{1/2})_a(R_2SiO_{2/2})_b(RSiO_{3/2})_c(SiO_{4/2})_d$ wherein a>0, d>0, b≧0, c≧0, a+b+c+d=1.0≦(b+c)≦0.2, and R is a monovalent radical independently selected from the group consisting of hydrogen, hydroxyl, alkyl, alkenyl, alkoxy, —OZ and Z; wherein Z is a fluorine atom-containing group; and wherein the sum of the average number of silicon-bonded alkenyl groups per molecule in component (A) and the average number of silicon-bonded hydrogen atoms per molecule in component (B) is greater than four;

(II) allowing the composition to cure to a silicone elastomer; and (III) sealing the container by securing the cured elastomer to a surface on the container.

28. A resinous organosiloxane copolymer having at least one fluorine atom-containing group per molecule, an average of at least two alkenyl groups per molecule, a number average molecular weight (Mn) between about 400 and about 15,000 g/mole and having the empirical formula:

$(R_3SiO_{1/2})_a(R_2SiO_{2/2})_b(RSiO_{3/2})_c(SiO_{4/2})_d$ wherein a>0, d>0, b≧0, c≧0, a+b+c+d=1.0≦(b+c)≦0.2, and R is a monovalent radical independently selected from the group consisting of hydrogen, hydroxyl, alkyl, alkenyl, alkoxy, —OZ and Z; wherein Z is a fluorine atom-containing group.

29. The resinous organosiloxane copolymer of claim 28, wherein at least an average of one R per molecule is an —OZ radical.

30. The organosiloxane composition of claim 29, wherein the —OZ radical is selected from the group consisting of radicals having the general formula:

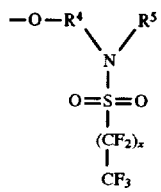

and radicals having the general formula:

—O—R⁴—(CF₂)ₓCF₃ wherein $R^4$ is an alkylene group having 2 to 6 carbon atoms and 0≦x≦12 and ⁵ is an alkyl group having 1 to 6 carbon atoms.

* * * * *